US008604756B2

(12) United States Patent
Dooley

(10) Patent No.: US 8,604,756 B2
(45) Date of Patent: Dec. 10, 2013

(54) CONTROLLING TRANSIENT RESPONSE OF A POWER SUPPLY

(75) Inventor: Kevin A. Dooley, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 956 days.

(21) Appl. No.: 12/201,656

(22) Filed: Aug. 29, 2008

(65) Prior Publication Data

US 2010/0054006 A1 Mar. 4, 2010

(51) Int. Cl.
*H02P 9/00* (2006.01)
*H02P 11/00* (2006.01)

(52) U.S. Cl.
USPC ............................................. 322/44; 322/28

(58) Field of Classification Search
USPC .......... 322/44, 20, 89, 59, 24, 28; 290/55, 44; 700/286, 297
See application file for complete search history.

(56) References Cited

U.S. PATENT DOCUMENTS

| | | | | |
|---|---|---|---|---|
| 3,211,987 | A * | 10/1965 | Gatlin et al. | 322/24 |
| 3,242,302 | A * | 3/1966 | Williams | 219/663 |
| 3,619,763 | A * | 11/1971 | Wyles | 322/32 |
| 3,984,755 | A * | 10/1976 | Lehnhoff et al. | 322/28 |
| 4,912,372 | A * | 3/1990 | Mongoven et al. | 315/122 |
| 4,922,179 | A * | 5/1990 | Nishimura | 322/25 |
| 5,038,095 | A | 8/1991 | Kirchberg et al. | |
| 5,754,011 | A * | 5/1998 | Frus et al. | 315/209 SC |
| 6,710,580 | B2 | 3/2004 | Shinba | |
| 6,989,655 | B2 * | 1/2006 | Eguchi et al. | 322/23 |
| 7,064,526 | B2 | 6/2006 | Patterson | |
| 7,161,329 | B2 | 1/2007 | McLoughlin et al. | |
| 7,176,658 | B2 * | 2/2007 | Quazi et al. | 322/24 |
| 7,180,270 | B2 * | 2/2007 | Rufer et al. | 322/20 |
| 7,242,167 | B2 | 7/2007 | Patterson | |
| 7,768,767 | B2 * | 8/2010 | Dooley | 361/253 |
| 7,830,127 | B2 * | 11/2010 | Corcelles Pereira et al. | 322/24 |
| 2005/0127880 | A1 * | 6/2005 | Colley | 322/7 |
| 2006/0261785 | A1 | 11/2006 | Horiuchi | |
| 2007/0236186 | A1 | 10/2007 | Patterson | |

OTHER PUBLICATIONS

Canadian Intellectual Property Office; Examiner's Requisition dated May 16, 2011.

Canadian Intellectual Property Office; Response to Examiner's Requisition and Voluntary Submission of Information dated Nov. 15, 2011.

Canadian Intellectual Property Office; Examiner's Requisition dated Apr. 17, 2012, issued in respect of Canadian Application No. 2,676,497; pp. 1-3.

Norton Rose Canada LLP; Response to Examiner's Requisition dated Oct. 17, 2012, filed in respect of Canadian Application No. 2,676,497; pp. 1-9.

* cited by examiner

*Primary Examiner* — Julio R Gonzalez

(74) *Attorney, Agent, or Firm* — Norton Rose Fulbright Canada LLP

(57) ABSTRACT

A method and apparatus is provided to, among other things, supply power to a load under various load conditions. Output voltage transient responses of the system, such as may be caused by transients changes in the load conditions, may be controlled through current transformation on the output in order to correct or impede over-voltage conditions of the transient response.

8 Claims, 4 Drawing Sheets

CONTROLLING TRANSIENT RESPONSE OF A POWER SUPPLY

TECHNICAL FIELD

The present application relates to regulated power supply systems and methods for controlling transient responses in such systems.

BACKGROUND

Voltage transients caused by load changes or unstable load conditions can be difficult to correct quickly enough to prevent over-voltage conditions on the power supply output.

For example, unstable load conditions causing oscillations in supply voltage tend to occur when a negative impendence load is supplied in power by a conventional regulated power supply system. This is because negative impendence characteristics, in contrast with conventional resistive loads and inductive loads, generate current variations which are 180 degrees out of phase with supply voltage variations. Hence, for a negative impedance load supplied with constant power, a slight increase in output voltage tends to decrease the current absorbed by the load, which in turn tends to cause the load voltage to rise even further leading to an unstable condition which may damage the power supply system and its loads.

There is thus a need for a regulated power supply system which exhibits an improved response to transient load changes or unstable load conditions.

SUMMARY

In accordance with one aspect, there is provided a power supply system for controlling an output fluctuation, the system comprising: a current controlled current source, the source having an output circuit and a control circuit, the control circuit including a DC current source connected thereto for generating a control current, the circuits being inductively coupled such that current in the control circuit is proportional to current in the output circuit, the output circuit connected to a load; and a current transformer having a primary coil connected in series with the output circuit and a secondary connected in series with the control circuit.

In accordance with another aspect, there is provided a power supply apparatus for controlling an output fluctuation to a load, the system comprising: a permanent magnet generator/alternator assembly having at least one primary winding and at least one control winding, the primary winding connected to an output circuit including a load, the control winding connected to a control circuit including a DC control current source, the assembly having means for inductively coupling the primary and control windings such that current is in the primary is proportional to current in the control; and a current transformer having a primary coil connected in series with the output circuit and a secondary connected in series with the control circuit.

In accordance with aspect, there is provided a method for controlling an transient in a load circuit of a power supply, the method comprising: providing a current controlled current source having the output circuit inductively coupled to a control circuit such that current in the control circuit is proportionally to current in the output circuit; providing a DC control current to the control circuit and operating the current controlled current source to provide a current to a load via output terminals of an output circuit; inductively coupling an output terminal of the output circuit to the control circuit, such that a sudden decrease in current at the output terminal effects a proportional decrease in control current, thereby permitting the control circuit to control a transient load response in the output circuit.

BRIEF DESCRIPTION OF THE DRAWINGS

Further details will be apparent from the following detailed description, taken in combination with the appended figures, in which.

It will be noted that throughout the appended drawings, like features are identified by like reference numerals.

DETAILED DESCRIPTION

Figure 1:
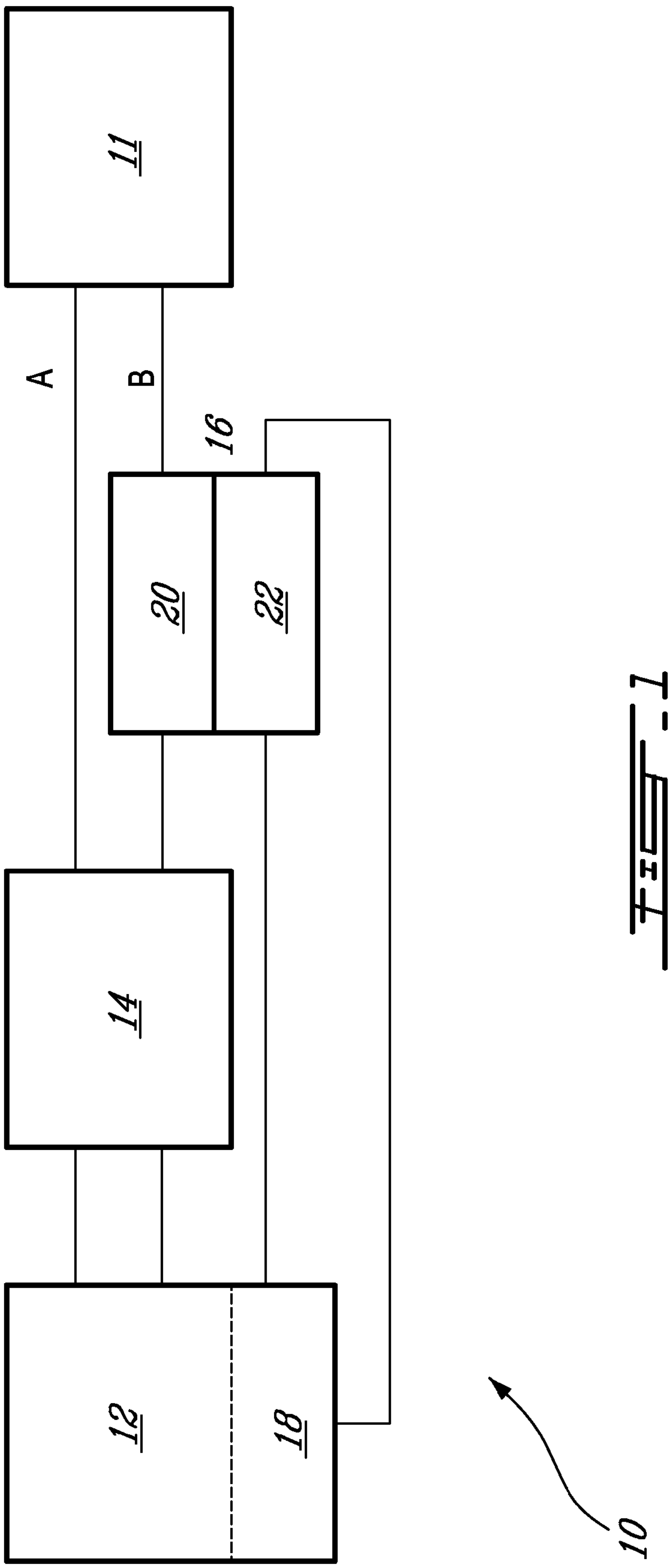
FIG. 1 is a schematic illustration of an example power supply system.

Referring to FIG. 1, the power supply system 10 has two output terminals A and B connected to a load 11. The power supply system 10 has a current controlled current source 12, a filtering device 14, a current transformer 16 and control circuitry 18.

A current transformer 16, having a primary 20 and a secondary 22, is connected in series with one of the power supply output conductors and directly in series with the load circuit 11. In particular, the primary 20 of the current transformer 16 is connected in series with the load 11 (i.e. between the output terminal B and the filtering device 14). DC output current supplied from the current controlled current source 12 flows to (in this example) the load via the current transformer primary 20. Thus, output current of the current controlled current source 12 provided to the external load 11 also flows through the primary 20 of the current transformer 16. The secondary 22 of the current transformer 16 is connected in series with the control circuitry 18, such that any transient current requested from the source 12 by current in the control circuitry 18, also flows in the secondary 22 of the current transformer 16 as well as in the control circuitry 18.

The operation of power supply system 10 may be better understood with reference to a specific implementation of the system, such as is presented in FIG. 3 and will now be discussed.

Figure 3:
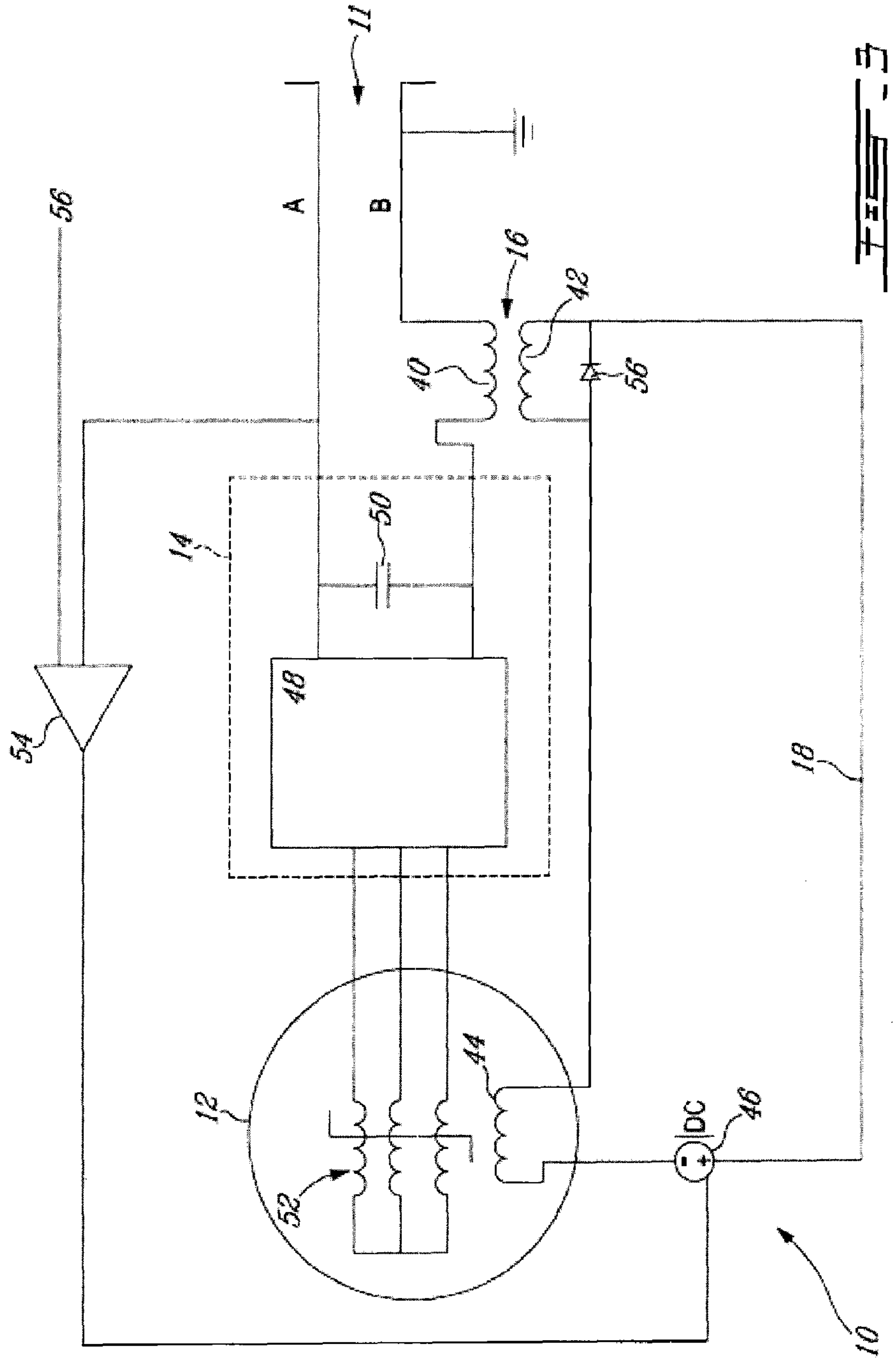
FIG. 3 is a schematic illustration of one possible embodiment of the power supply system of FIG. 1.

Referring to FIG. 3, in one example the current controlled current source 12 may include a permanent magnet generator/alternator 12 of the general type described in U.S. Pat. No. 7,262,539, the full contents and teachings of which patent are incorporated herein by reference. Further in this example, the generator/alternator 12 may be filtered by a filtering device 14 and may be modulated or regulated to provide a regulated DC output voltage, as is described in United States Published Patent Application US20080067982A1, the full contents and teachings of which published application are incorporated herein by reference. It will be understood, in light of the teachings herein and in the incorporated references, that controlling the control current delivered to the generator/alternator 12 allows the generator/alternator to behave as a current controlled current source.

The generator/alternator 12 in this example has multiple alternator phase coils 52 which are inductively coupled to a control coil (or coils) 44 as described in U.S. Pat. No. 7,262,539, so that current in the control coil(s) 44 proportionally affects the output power of by the generator/alternator 12. A transfer ratio may be provided between the control coil(s) 44 and the phase coils 52, such as a transfer ratio of 5:1 in this example. The control current flowing in the control coil 44 may optionally be externally controlled by a variable DC current source 46, as described in US20080067982A1, to vary the current flowing in the secondary coil inversely to a variation in current occurring in the primary coil. A voltage feedback 54 of the type described in US20080067982A1 be provided relative to a reference signal 5. Filtering device 14 may be provided by a rectifier circuit 48, which may include a capacitor 50. Any suitable filtering device 14 may be used. The skilled reader will appreciate that, although useful the purpose of the present description, FIG. 3 is highly schematic and does not necessarily show all system components or show all components in their correct number or exact physical placement.

Figure 4:
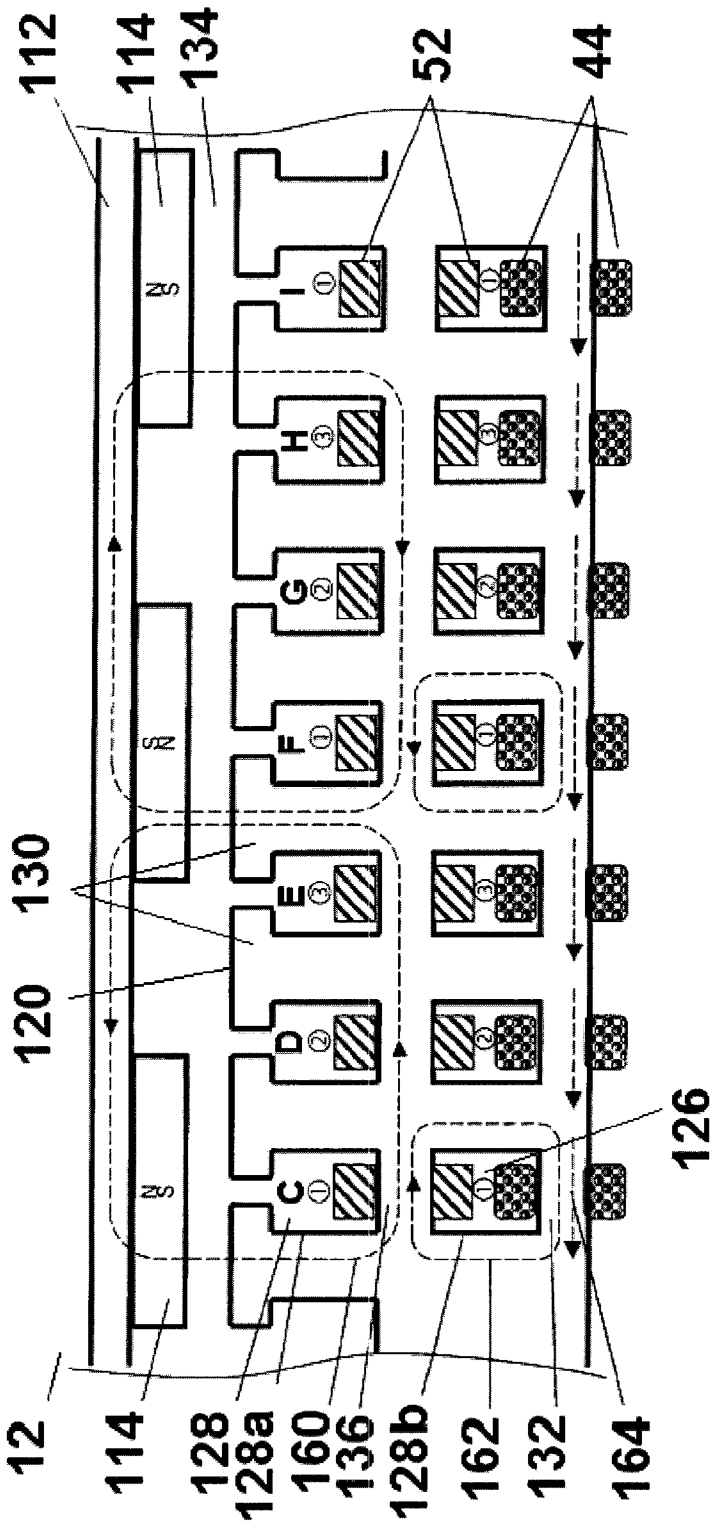
FIG. 4 is a schematic partial cross-sectional view of an alternator/motor.

Referring to FIG. 4, alternator/motor 12 has a rotor 112 with permanent magnets 114 which is mounted for rotation relative to a stator 120. Stator 120 has at least one power winding 52 and preferably at least one control winding 44, and this embodiment stator 120 has a 3-phase design with three electromagnetically-independent power windings 52 (the phases are denoted by the circled numerals 1, 2, 3, respectively) and, correspondingly, three independent control windings 44. The power and control windings are separated in this embodiment by a winding air gap 126 and disposed in radial slots 128 between a plurality of adjacent teeth 130. (For ease of illustration in FIG. 4, the adjacent elements of control winding 44 are shown unconnected. For ease of description, the adjacent slots 128 are indicated as C, D, E, F etc.) Power winding 52 and control winding 44 are electrically isolated from one another. A back iron 132, or control flux bus as it is described in this application, extends between slots 128. A rotor air gap 134 separates rotor 112 and stator 120 in a typical fashion. A core or "bridge" portion or "power flux bus" 136 portion of stator also extends between adjacent pairs of teeth 130 between adjacent portions of power winding 52.

Referring again to FIG. 4, in use, in a alternator mode rotor 112 is moved relative to stator 120, and the interaction of magnets 114 and power windings 52 creates a primary magnetic flux within PM machine 12 along a primary magnetic flux path or magnetic circuit 160. The primary flux induces a voltage in the power winding, which when an electrical load is connected results in an induced current, and the induced current causes a secondary magnetic flux to circulate an adjacent secondary magnetic flux path or magnetic circuit 162. The primary and secondary circuits are thus magnetically coupled when a current flows in the power winding. The secondary magnetic circuit 162 is for the most pail isolated from the rotor and primary magnetic circuit 160. (It is to be understood that this description applies only to phase "1" of the described embodiment, and that similar interactions, etc. occur in respect of the other phases). The skilled reader will appreciate in light of this disclosure that it may be desirable in many situations to include a regulation apparatus to maintain a minimum current in the power winding during no-load conditions.

Primary magnetic circuit 60 includes rotor 112, rotor air gap 134, power flux bus 136 and the portion of stator teeth 130 between rotor 112 and power flux bus 136. Primary magnetic circuit encircles a portion of power winding 52 and, in use as an alternator causes a current flow in power winding 52. Secondary magnetic circuit 162 includes power flux bus 136, control bus 132 and the portion of stator teeth 130 between control bus 132 and power flux bus 136. In this embodiment, secondary magnetic circuit encircles the portions of the power winding 52 and control winding 44 in slot 128*b*. Power flux bus 136 divides slot 128 into two slot portions or openings 128*a* and 128*b*, with one opening 128*a* for the power winding only, and another opening 128*b* for the power and control windings. The primary magnetic circuit encircles an opening 128*a* while the secondary magnetic circuit encircles an opening 128*b*. Opening 128*a* is preferably radially closer to the rotor than opening 128*b*. Power flux bus 136 is preferably common to both the primary and secondary magnetic circuit paths and thus the primary and secondary magnetic circuits are magnetically coupled, as mentioned.

A tertiary magnetic circuit 164 preferably circulates around control bus 132, as partially indicated in FIG. 4 (i.e. only a portion of the tertiary circuit is shown, as in this embodiment the tertiary circuit circulates the entire stator). The control flux bus 132 is preferably common to both the secondary and tertiary magnetic circuit paths and thus the secondary and tertiary magnetic circuits are also magnetically coupled. As mentioned, at least a portion of control flux bus 132 is saturable.

In use, as is described in more detail US20080067982A1, the current delivered by such a generator/alternator 12 is proportional to the control current provided to the control coil(s) 44 of the alternator by the source 46. The generator/alternator 12, its associated control circuit 18, and the filtering device 14 thus form together an apparatus useful for generating regulated output voltage. The system 10 may thus be used to provide regulated power.

Referring still to FIG. 3, transient control may be provided by connection of system 10 to a current transformer 16, as will now be described. A primary coil 40 of the transformer 16 is connected in series with the DC output terminal B of the power supply system 10, while a secondary coil 42 of the transformer is connected in series with the control coil 44 and allows for a current to flow in a direction reverse to a direction of a current flowing in the primary coil 40, thereby having the effect of cancelling DC fluxes occurring in the core of the current transformer 16. A diode 56 is provided across the transformer secondary in the control circuit of this example to prevent the voltage across the secondary from reversing polarity.

The transformer primary-to-secondary ratio may be matched to the current controlled current source transfer ratio. For example, the generator/alternator 12 of FIG. 3 may have a transfer ratio of 5:1, meaning that the output current of the generator/alternator 12 is 5 times the control current input. While the current controlled current source may have any suitable current transfer ratio, matching the current transformer 16 primary-to-secondary ratio to the current transfer ratio of the current controlled current source may assist with ensuring that the current transformer 16 core remains unsaturated, since ampere turns in the primary are equal and opposite to the ampere turns in the secondary, thus resulting in cancellation of the flux in the core of the transformer. Consequently, the current transformer 16 may also be provided with a primary-to-secondary ratio of 5:1.

Referring still to FIG. 3, in use, it will be understood that changes in currents flowing respectively in the primary 40 and the secondary 42 of the current transformer 16 are related, such that if there should be an unrequested change in the current in the load circuit 11, for example caused by a sudden open circuiting of the load (a breaker circuit opening, for example), the current flowing in the secondary 42 will be influenced by the primary current such that the current flowing in the secondary 42 will be reduced at virtually the same instant. This will cause, in this example, the control current provided by the circuit 18 to the current controlled source 12 to be suddenly reduced, as well. As noted above, since output current is proportional to control current in current controlled current source 12, reducing the control current will also reduce the output current from the source 12, virtually in synchronism with the sudden loss of load. Without this current transformer 16 arrangement, the output voltage of the current source 12 would otherwise suddenly increase in response to an open circuit on the load, since the output load resistance has suddenly greatly increased. the skilled reader will appreciate that, if a voltage feedback 54 (as is further described in US20080067982A1) is provided, the output voltage of the source 12 would eventually (i.e. after some transient time) return to the desired/set output voltage through the control action of the voltage feedback, however the current transformer of the present arrangement provides a faster response time.

In the case where the control circuit 18 has an intrinsic inductance, such as where the circuit includes one or more control coils, the time to reduce the current in the control circuit may be dependant on the voltage which is available within the control circuit. As current in the control circuit changed, the inductively-generated back EMF (i.e. V=L*dI/dT, where V is voltage, L is inductance, I is current and T is time) relative to the available voltage across the control circuit tends to limit how quickly the control current can be changed. However, in the case where, say, a 5:1 transfer ratio is present between control and output in the current controlled source, the output voltage available on the secondary of the current transformer is 5 times greater than the voltage change at the current transformer primary and, as such, provides a control action which is 5 times faster than may otherwise be obtained from the voltage control portion of the control circuit 18.

Referring again to FIG. 1, therefore when a change (also referred to as an output fluctuation or a transient) in the output current at the output terminals A and B occurs, a control current flowing in the control circuit 18 instantaneously changes direction in a suitable direction to change the output power to correct the output power generated by the generator/alternator 12. The direction of the control current reduces the output power supplied through inductive coupling effects of the control circuit within the generator/alternator 12. The current on the control circuit, is influenced in a direction that adjusts the output current according to the load demand for transient conditions. In this example, the net control current will reduce/increase in response to a load transient (depending on the transient to be controlled). Therefore, a sudden drop in load current (e.g. due to an open circuit on the load) will also cause a drop in control current, which will effect a drop in generated current from the source. This reduction in generated current, in turn, reduces the output voltage and DC output current through the primary conductive device 20, thus mitigating positive output voltage transients due to sudden load reductions.

The described approach may thus provide a direct feedback mechanism useful, in one example, in case of sudden, unrequested transients in a condition of the load 11. The feedback mechanism allows the reduction of voltage transients caused by sudden changes in a load condition or an unstable load condition.

Figure 2:
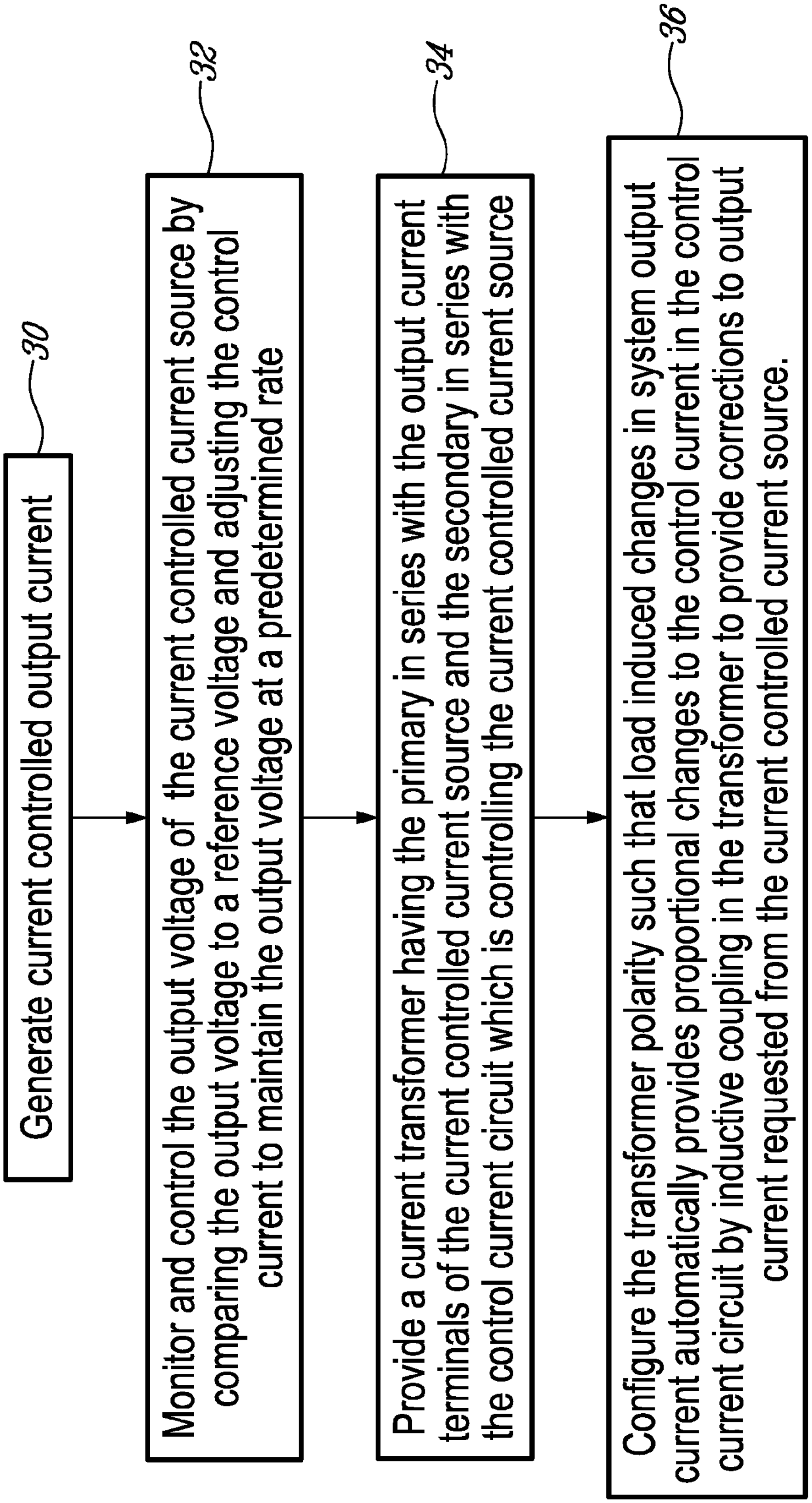
FIG. 2 is a flow chart for an example method of controlling a transient response of a power supply to a load.

FIG. 2 illustrates one example method of controlling a transient response of a power supply system, as will now be described.

In step 30 a current controlled output current is generated.

In step 32, the output voltage is optionally monitored and controlled by comparing the output voltage of the source to a reference voltage, and the control current is adjusted to maintain the output voltage at a predetermined rate/level.

In step 34, a current transformer is provided with the primary in series with the output current terminals of the current controlled current source and the secondary in series with a control current circuit controlling the current controlled current source.

In step 36, the current transformer polarity is configured such that load-induced changes in system output current automatically provide proportional changes to the control current in the control current circuit, to thereby effect corrections to output current requested from the current controlled current source in response to load transients.

It will be understood that constant power loads often exhibit negative impedance instability characteristics. In the present arrangement, as current absorbed by the constant power load decreases, the transformer 16 reacts to the change in the supplied output current at the terminals A and B such that the output current is reduced in a controlled manner. The controlled reduction in the output current to the load, in turn, reduces the output voltage at the load. This tends to reduce the amount of phase shift between the current and the voltage at the load which is usually seen when the load exhibits negative impedance characteristics. The instabilities may therefore be alleviated through operation of the transformer 16.

It will also be understood that other variants of the power supply system 10 are possible in accordance with given practical applications. For example, the current controlled current source 12 may be any suitable current controlled current source. The embodiments described above therefore are intended to be exemplary only, and are susceptible to modification without departing from the present application. The application is intended to be limited solely by the scope of the appended claims.

What is claimed is:

1. A power supply system for controlling an output fluctuation to a load, the system comprising:

a current controlled current source, the source having a generator/alternator with at least one phase winding in series with an output circuit and at least one control winding in series with a control circuit, the output circuit being configured for connection to the load, and the at least one phase winding and the control winding being inductively coupled such that a control current generated in the control circuit induces a proportional current in the output circuit; and a current transformer having a primary coil connected in series with the output circuit and a secondary coil connected in series with the control circuit, the current transformer thereby configured to generate the control current such that the current generated by the current controlled current source in the output circuit is responsive to current changes in the load.

2. The power supply system of claim 1 wherein the generator/alternator has a rotor and a stator cooperating to define a rotor magnetic circuit around a first portion of the at least one phase winding, the stator defining a secondary magnetic circuit encircling only a portion of the control winding and a second portion of the at least one phase winding different from the first portion.

3. The power supply system of claim 1, wherein a turns ratio of the at least one phase winding to the control winding is equal to a turns ratio of the primary coil of the current transformer to the secondary coil of the current transformer.

4. The power supply system of claim 2, wherein a turns ratio of the at least one phase winding to the control winding is equal to a turns ratio of the primary coil of the current transformer to the secondary coil of the current transformer.

5. The power supply system of claim 1, further comprising a filtering device for regulating a generated output current from the generator/alternator.

6. A power supply apparatus for controlling an output fluctuation to a load, the system comprising:

a permanent magnet generator/alternator assembly having at least one phase winding and at least one control winding, the at least one phase winding being connected to an output circuit configured for connection to the load, the control winding being connected to a control circuit, and the at least one phase winding and the control winding being inductively coupled such that a control current generated in the control winding induces a proportional current in the at least one phase winding; and a current transformer having a primary coil connected in series with the output circuit and a secondary coil connected in series with the control circuit, the current transformer thereby configured to generate the control current such that the current generated in the at least one phase winding of the permanent magnet generator/alternator assembly is responsive to current changes in the load.

7. The power supply system of claim 6, wherein a turns ratio of the generator/alternator control winding to the at least one phase winding is equal to a turns ratio of the current transformer.

8. The power supply system of claim 6, further comprising a filtering device for regulating a generated output current from the permanent magnet generator/alternator assembly.

* * * * *